Sept. 17, 1968   P. E. GIES   3,401,989
HIGH PRESSURE SHAFT SEALS
Filed March 30, 1966   2 Sheets-Sheet 1
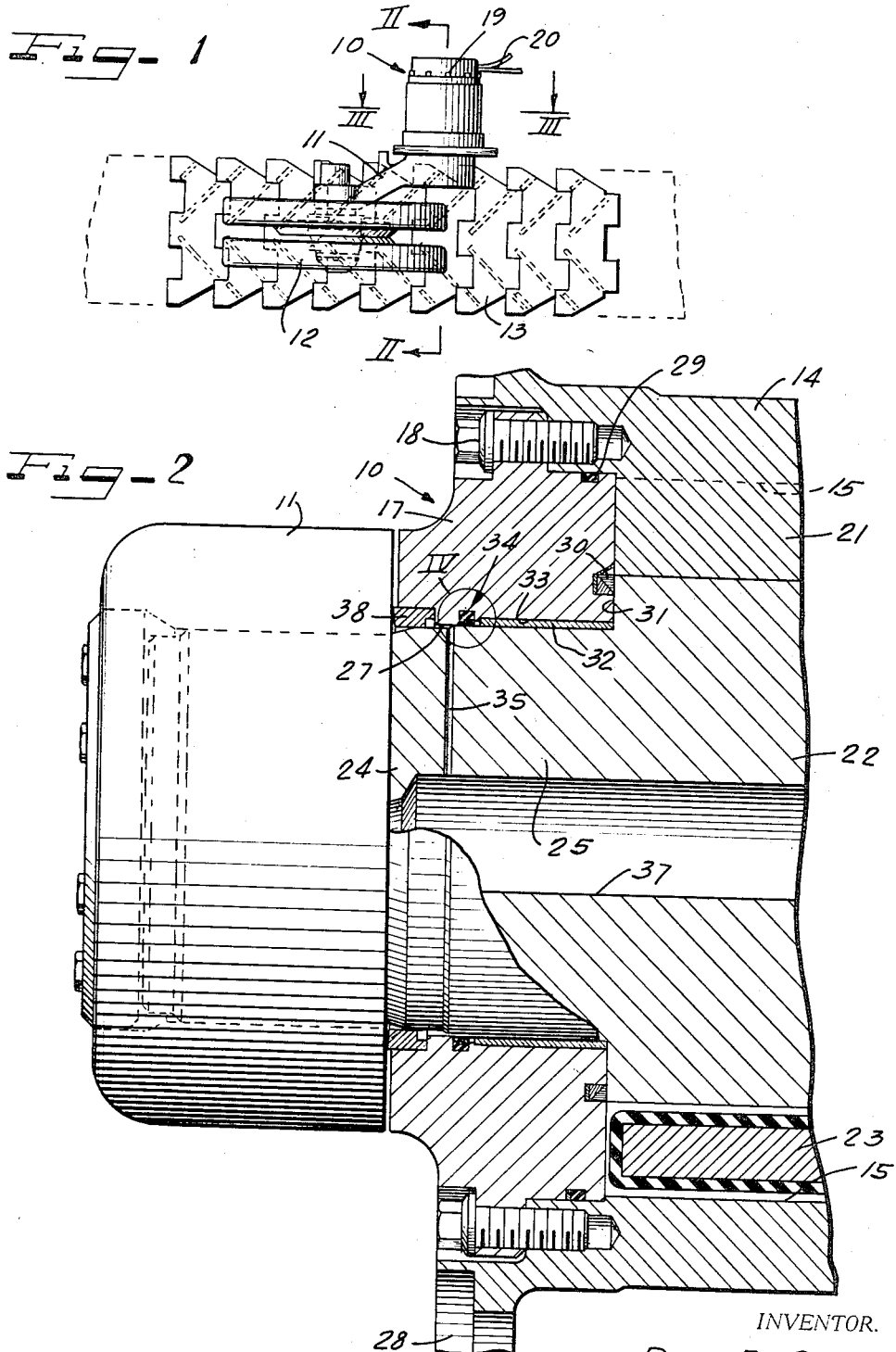
INVENTOR.
PAUL E. GIES
BY Hill, Sherman, Meroni, Gross & Simpson   ATTORNEYS Sept. 17, 1968  P. E. GIES  3,401,989
HIGH PRESSURE SHAFT SEALS
Filed March 30, 1966  2 Sheets-Sheet 2
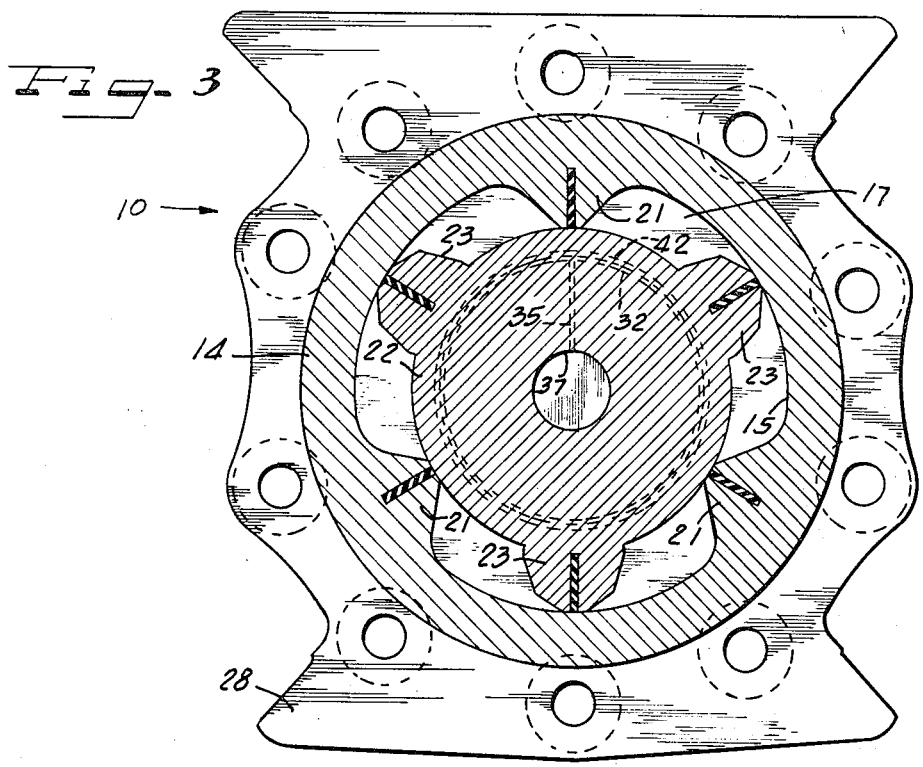
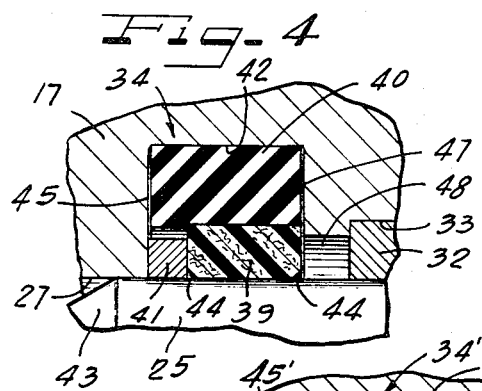
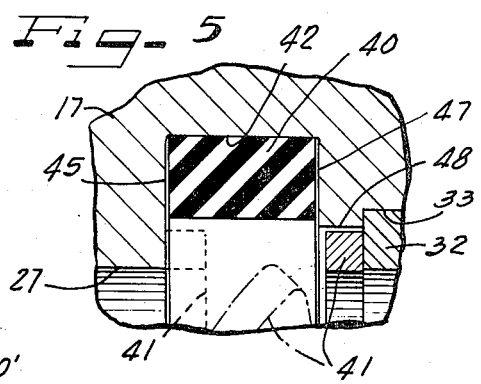
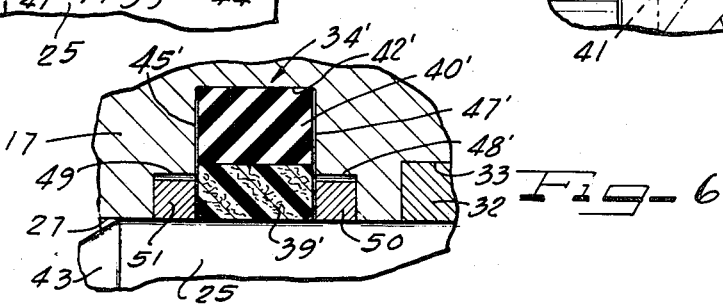
INVENTOR.
PAUL E. GIES
BY  ATTORNEYS

United States Patent Office 3,401,989
Patented Sept. 17, 1968

3,401,989
HIGH PRESSURE SHAFT SEALS
Paul E. Gies, Eggertsville, N.Y., assignor to Houdaille Industries, Inc., Buffalo, N.Y., a corporation of Michigan
Filed Mar. 30, 1966, Ser. No. 538,738
6 Claims. (Cl. 308—361)

ABSTRACT OF THE DISCLOSURE

An assembly including a housing having a rotary shaft journaled therein an annular groove in the housing defining a sealed chamber. A seal ring engages the shaft sealingly in the chamber and a combination squeezing and sealing ring engaged in the chamber embraces and presses the seal ring against the shaft. A continuous anti-extrusion backup ring in interference press fit corotative engagement with the shaft is interposed between the seal ring and an axially facing surface of the shaft. In another form backup rings which are not in interference fit with the shaft oppose opposite ends of the sealing ring. The backup ring is continuously and resiliently deformable to be mounted through the housing bore into the seal groove chamber.

---

This invention relates to novel high pressure shaft seals, and is more particularly concerned with seals of this type which are especially useful with oscillatory shafts such as in heavy duty rotary actuators.

With heavy duty equipment such as the rotary actuators employed in the hydro-pneumatic suspensions of endless track vehicles, a decided problem is that of preventing leakage along the oscillatory shafts. In such actuators not only are the operating temperatures liable to wide variation, but more particularly the pressures to which the shaft seals are subjected fluctuate greatly. In a typical example, temperatures may range from about −65° F. to 250° F., while external pressures may range from partial vacuum to 3000 p.s.i. for short periods with atmospheric pressure normal, and internal pressures vary from 1000 p.s.i. to 10,000 p.s.i. and higher. Add to these abusive conditions the virtually incessant oscillatory relative rubbing action on the opposing surfaces of the seal and the apparatus, and the magnitude of the problem is readily apparent. In addition to the problems of wear are the problem of liability of sealing rings to extrude along the shaft and journal housing joint.

Accordingly, an important object of the invention is to overcome all of the foregoing and other difficulties and disadvantages of prior seals and to provide a new seal structure which is especially suitable for, and which is long lived under, conditions of oscillatory motion, wide operating temperature differentials, and which is capable of withstanding a wide range of external and internal pressure variations including intensive internal pressure surges.

Another object of the invention is to provide a novel high pressure shaft seal structure which is especially suitable for use between the housing and the wing shaft of a road wheel rotary actuator in an endless track vehicle running gear, and more particularly as the principal shaft seal between the working chamber area of the actuator and the external end of the joint between the shaft and the housing.

A further object of the invention is to provide a novel high pressure shaft seal of the character indicated which is simple, comprises a minimum number of parts, is highly efficient and durable, and of low cost.

Still another object of the invention is to provide a novel high pressure shaft sealing ring assembly and including an effective anti-extrusion ring.

A yet further object of the invention is to provide a novel high pressure sealing ring structure of the character indicated and a method of providing such a sealing structure.

Other objects, features and advantages of the present invention will be readily apparent from the following detailed description of certain preferred embodiments thereof, taken in conjunction with the accompanying drawings, in which:

FIGURE 1 is a fragmentary top plan view of an endless track vehicle running gear employing a rotary actuator embodying features of the invention;

FIGURE 2 is an enlarged fragmentary axial sectional detail view through the actuator taken substantially in the plane of line II–II of FIGURE 1;

FIGURE 3 is an enlarged cross sectional detail view taken substantially on the line III—III of FIGURE 1;

FIGURE 4 is a substantially enlarged fragmentary sectional detail view showing the sealing structure in the area IV of FIGURE 2;

FIGURE 5 is a sectional view similar to FIGURE 4 but showing various steps in assembling of the components of the sealing structure; and FIGURE 6 is a similar sectional view showing a modification.

As an example of apparatus in which the present invention is especially useful, FIGURE 1 depicts a rotary actuator 10 comprising part of a hydro-pneumatic suspension system for endless crawler track running gear of a land or amphibious vehicle, attached to the body frame or hull (not shown) of which the actuator is fixedly attached. Operatively connected to the actuator is a road arm 11 rotatably mounting a road wheel 12 in running, levelling control of an endless track 13.

The rotary actuator 10 comprises a housing including a tubular body 14 defining therein a working chamber 15 (FIGS. 2 and 3) closed at its front end by an end closure disk member 17 attached to the body by means of screws 18. At its opposite end, the working chamber 15 is closed by an end closure and manifold structure 19 secured to the body 14 and arranged to be connected by suitable conduits 20 operatively into a hydraulic control system of the associated vehicle.

Within the working chamber 15, the housing 14 has a plurality of equally spaced radially inwardly projecting abutments 21 which at their tips slidably engage the cylindrical perimeter of a wing shaft 22 provided with radially outwardly projecting vanes 23 equal in number and spacing to the abutments and slidably engaging the generally cylindrical wall defining the working chamber 15 between the abutments. Thereby, the wing shaft 22 is adapted for oscillatable movement within the actuator housing responsive to differential hydraulic pressure on respectively opposite sides of the vanes or by the mechanical stimulus of the road arm 11 which is fixedly attached to a forward, outwardly projecting terminal or end portion 24 of a journal 25 on the wing shaft projecting through the end closure member 17 which provides a journal bore 27 therefor. About its forward end portion, the housing body 14 has a lateral suitably perforated attachment flange 28 by which it is adapted to be bolted onto the associated vehicle frame or hull.

Against leakage of hydraulic fluid from the working chamber 15 past the end closure 17, a static ring seal 29 is mounted between the end member and the body 14, and a dynamic seal 30 is mounted in the end member 17 in opposition to an axially outwardly facing shoulder 31 on the wing shaft body. However, sufficient hydraulic fluid leaks past the seal 30 to lubricate a bearing 32 for the journal 24. This bearing is mounted in a complementary groove 33 in the journal bore 27 between the inner end of the end closure member 17 and a dynamic high pressure shaft seal 34 located inwardly adjacent to a bleed-off or drain port 35 leading from the outer perimeter of the journal 25 into an axial bore 37 in the wing shaft suitably communicating with a drain duct in the hydraulic circuit to which the actuator is connected. Outwardly from the drain port a low pressure dynamic seal and anti-contamination barrier 38 seals the joint between the journal and the end closure member 17 as well as the joint between the opposing surfaces of the head end portion of the road arm 11 and the outer end of the end member 17.

High operating pressure surges must be countered in operation of the actuator 10. In a typical example, these may exceed 6,000 p.s.i. This places a heavy load on the dynamic seals. Along the journal 25 problems of excessive seal wear and seal extrusion are encountered. These problems have been satisfactorily met by means of the seal structure 34 which comprises an assembly of a wear-resisting seal ring 39, a squeezing and sealing ring 40 and an anti-extrusion backup ring 41 mounted together within a suitable radially inwardly opening seal groove 42 formed in the bore 27 of the end member 17.

In a desirable construction, the seal ring 39 is made as a molded part of reinforced self-lubricating plastic material comprising, or at least having the properties of, polytetrafluoroethylene reinforced by means such as fiberglass fibers uniformly distributed therethrough. By bulk, the reinforcing fibers may comprise about one-fourth or less of the sealing ring. In addition, self-lubricating properties of the ring are desirably improved by incorporating in the ring a particulate solid state lubricating material such as, or having the properties of, powdered molybdenum disulfide. In a practical example, the plastic has constituted 75% by volume, the reinforcing fibers 23% and the particulate lubricating material 2%. By preference the material of the seal ring should be possessed of a minimum hardness rated as sixty Shore D hardness measurement scale.

Dimensionally the seal ring 39 is desirably of sufficient width to afford substantial axial resistance to deformation. In thickness the seal ring 39 may be, and desirably is less than the width dimension to afford some elasticity, enabling the ring to be stretched from a slightly smaller inside diameter to the larger outside diameter of the journal 25. To facilitate such stretching, the journal 25 has a lead-in chamfered cam surface 43 from a reduced diameter surface axially outwardly from the annular area of the journal about which the seal assembly 34 is engaged. On at least one of the inside corners of the otherwise rectangular axial cross section of the seal ring 39, it is provided with a camming chamfer 44 which will cooperate with the lead-in cam surface 43 in stretchably easing the seal ring onto the journal 25. By providing the opposite inside corner of the seal ring 39 with a similar chamfer 44, either end of the ring may be indiscriminately applied in effecting assembly with the journal 25.

Additional sealing pressure of the inner annular surface of the seal ring 39 against the journal 25 is effected by compression force exerted in uniform radial relation thereagainst by the squeezing ring 40 which embraces the entire outer perimeter of the seal ring. For this purpose the ring 40 is made from a suitable elastomer of a compound which is resistant to deterioration under the temperatures encountered in operation and the oil or other fluids with which the ring may come in contact in use. Desirably, the ring 40 is of slightly smaller inside diameter than the outside diameter of the seal ring 39, and of slightly larger diameter than the root diameter of the seal chamber groove 42. Thereby, not only does the squeezing ring 40 firmly thrust against the seal ring 39 for imparting a sealing bias of the seal ring against the journal, but the ring 40 also thrusts sealingly against the groove root surfaces. Therefore, the seal ring 39 and the squeezing ring 40 together afford a sealing barrier to hydraulic fluid which may escape past the bearing 32.

Construction of the anti-extrusion backup ring 41 is such that it will be in press fit mounted engagement with the journal 25. For this purpose, the ring 41 is made from suitable metals such as ductile iron, beryllium copper or aluminum bronze, of substantially square axial cross section, having its inside diameter normally slightly smaller than the journal 25. On its outside diameter, the ring 41 is desirably less than that of the bearing 32 and small enough to fit inside the squeezing ring 40. On one axial face, the ring 41 opposes the seal ring 39. On its opposite face, the ring 41 opposes a surface 45 which faces opposite to the direction of fluid pressure along the shaft, namely such surface 45 faces inwardly and rearwardly in this instance. The arrangement is such that fluid pressure driving along the journal 25 toward the surface 45 is intercepted by the seal ring 39 and the squeezing ring 40, tending to drive these rings outwardly or forwardly relative to the shaft. Since the seal ring 39 opposes the anti-extrusion ring 41, the latter blocks any possibility of the seal ring extruding along the shaft into the joint between the journal 25 and the bore 27. Irrespective of how severe the fluid pressure may be, the squeezing and sealing ring 40 cannot extrude because it is held by the seal ring 39 within the annular cavity of the groove chamber 42 and is blocked by the anti-extrusion ring 41. Any substantial displacement of the seal ring 39 and the squeezing ring 40 axially inwardly by pressure reversals or internal vacuum is precluded by the opposition of an axially outwardly facing wall 47 defining the seal groove chamber and opposing the axially inner ends of respectively the seal ring 39 and the ring 40.

In assembling the components, the bearing 32 is pressed into the bearing groove 33 in the end member 17. By the proper proportioning of the cross sectional dimension and proper choice of material, the ring 41 can be assembled, or disassembled with respect to the end member 17 by slightly deforming this ring as indicated in dot dash outline in FIGURE 5 so as to clear it through the bore 27 or through the bearing 32. During the assembling operation, the ring 41 is moved into a clearance groove 48 at the inner side of the seal chamber 42 but of smaller diameter than the bearing bore 33 and wider than the ring 41, utilizing the bearing as the inner side of the clearance groove. As shown in FIG. 5 when the ring 41 is in the groove 48, this ring entirely clears the seal chamber. Then the ring member 40 is mounted within the seal chamber by deforming or warping this ring as is permitted by its resiliently flexible structure. As soon as aligned with the seal chamber 42, the ring 40 will snap into place in the chamber. Then the anti-extrusion ring 41 is moved from the clearance groove 48 to the opposite side of the seal groove 42 and against the surface 45, as shown in dotted outline in FIG. 5. Assembly of the seal ring 39 is then easily effected by deforming or warping the seal ring and inserting it through the bore 27 or through the bearing 32 until it registers with the seal chamber 42 whereupon it is released and worked into position in the seal chamber. Assembly of the end cover member 17 over the journal 25 and into position on the housing body 14 is readily effected by axially inwardly moving the cover member during which the seal ring 39 is expansibly cammed by the oblique chamfer cam surface 43 onto the journal 25. During this action the ring 41 serves as a back-up for the ring 39. Then as the axial assembly action progresses, the cam surface 43 expands the ring 41 into interference fit with and about the journal 25, the chamber surface 45 thrusting the ring 41 to the desired assembly position longitudinally along the journal.

Because of the interference fit between the ring 41 and the journal 25, and the limited engagement of the seal ring 39 with the ring 41, and the normal absence of engagement of the squeezing ring 40 with the backup ring, there is a minimum of torque imposed on the backup ring 41 tending to cause it to turn on the journal 25, but enabling the backup ring to remain corotative with the journal in operation of the actuator. This avoids wear at the inner perimeter of the ring 41 and thus assures freedom from any gap through which extrusion of the sealing ring might occur under high internal pressure thrust.

Should there be a condition where the shaft may move axially, so that an interference fit between the backup or anti-extrusion ring would not be practicable, or where the pressure differential along the shaft changes direction, a dual anti-extrusion ring arrangement such as shown in FIGURE 6 may be employed. Under these conditions, the seal ring 39' and the squeezing and sealing ring 40' are of equal width, and the opposite sides of both of these rings oppose the seal chamber surfaces 45' and 47'. In addition to the groove 48', which may be a separate groove as shown, or may be similar to the groove 48 of FIGURES 4 and 5, a like groove 49 is provided on the axially outer side of the seal chamber opening through the surface 45'. An anti-extrusion backup ring 50 is mounted about the journal 25 in snugly sliding engagement within the groove 48' and a like ring 51 is mounted in the groove 49. In this arrangement, the rings 50 and 51 are first assembled within their grooves, in the same manner as explained for assembling of the ring 41, and the ring 50 moved into its groove 48' and the ring 51 moved into its groove 49, then the ring 40' is assembled within the groove chamber 42' and finally the seal ring 39' is moved into assembly. Thereafter the housing end member 17 with the seal assembly 34' fully mounted therein is moved axially into position on the wing shaft journal 25 and into closing relation to the housing body of the actuator.

It will be understood that variations and modifications may be effected without departing from the spirit and scope of the novel concepts of this invention.

I claim as my invention:

1. In an assembly including a housing having a rotary shaft journalled therein and liable to high fluid pressure leakage along the shaft:

the housing having an annular groove defining a seal chamber about the shaft and having an axially facing surface opposing the direction of a fluid pressure;

a seal ring engaged sealingly about the shaft in said chamber;

a combination squeezing and sealing ring engaged in said groove and embracing and pressing said seal ring against the shaft;

and a continuous anti-extrusion backup ring in interference press fit corotative engagement with said shaft and interposed between said seal ring and said axially facing surface.

2. An assembly according to claim 1, in which said anti-extrusion backup ring is of smaller diameter than the inside diameter of, and normally free from, said squeezing and sealing ring.

3. An assembly as defined in claim 1, in which said housing has an annular receiving groove for said anti-extrusion backup ring of smaller diameter than said seal chamber groove and opening into the seal chamber groove about said shaft, and said anti-extrusion backup ring being mounted within said smaller diameter groove.

4. An assembly as defined in claim 1, in which said anti-extrusion backup ring is of metal and is resiliently flexibly deformable with its outside diameter larger than the inside diameter of the housing about the shaft and is adapted to be flexibly deformed for assembly within the chamber or removal from the chamber.

5. An assembly as defined in claim 3, in which said housing has a journal bore complementary to the diameter of said shaft, a bearing mounted in said journal bore adjacent to the side of said chamber from which a fluid pressure approaches the chamber, and said smaller diameter groove being located between said bearing and said chamber.

6. An assembly as defined in claim 1, in which said housing has a journal bore complementary to said shaft, a bearing mounted in said journal bore adjacent to the side of said chamber from which a fluid pressure approaches, and a groove of smaller diameter than said chamber groove located between the bearing and the chamber and opening into the chamber and toward the shaft and adapted to accommodate said backup ring at least during assembling of the backup ring with the housing.

References Cited
UNITED STATES PATENTS

| | | | |
|---|---|---|---|
| 3,261,613 | 7/1966 | Norick | 277—176 |
| 2,622,449 | 12/1952 | Barker | 308—36.1 X |
| 2,862,736 | 12/1958 | Russell | 277—188 X |
| 2,973,978 | 3/1961 | Oppenheim | 277—188 |
| 2,974,983 | 3/1961 | Meyer | 277—188 |
| 3,033,578 | 5/1962 | Kellogg | 277—165 |
| 3,088,759 | 5/1963 | Corsette | 277—188 X |
| 3,172,670 | 3/1965 | Pras | 277—188 X |
| 3,179,018 | 4/1965 | Rumsey | 92—125 X |
| 3,282,289 | 11/1966 | Vick | 277—188 X |
| 3,300,225 | 1/1967 | Shepler | 277—188 X |
| 3,323,806 | 6/1967 | Smith | 277—188 X |

MARTIN P. SCHWADRON, *Primary Examiner.*

L. L. JOHNSON, *Assistant Examiner.*